Dec. 26, 1922.
F. MARTIN.
CORN HUSKING DEVICE.
FILED MAR. 25, 1921.
1,440,164
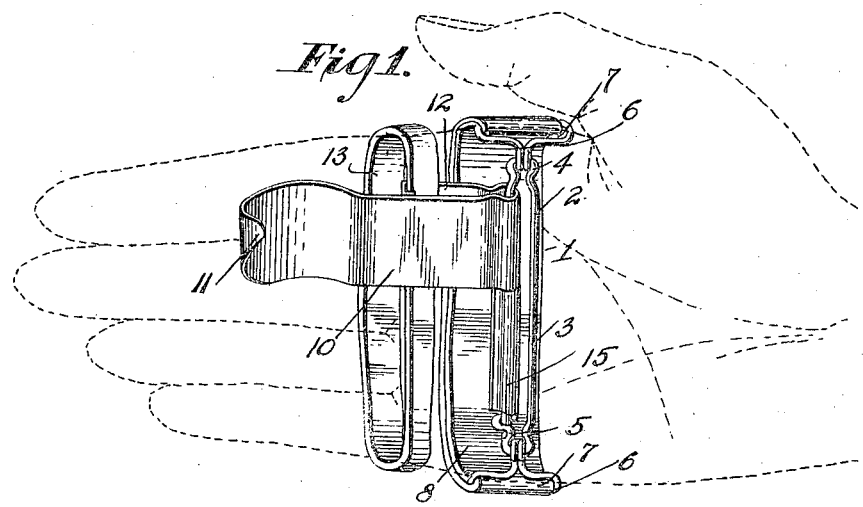
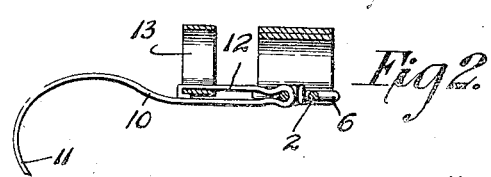
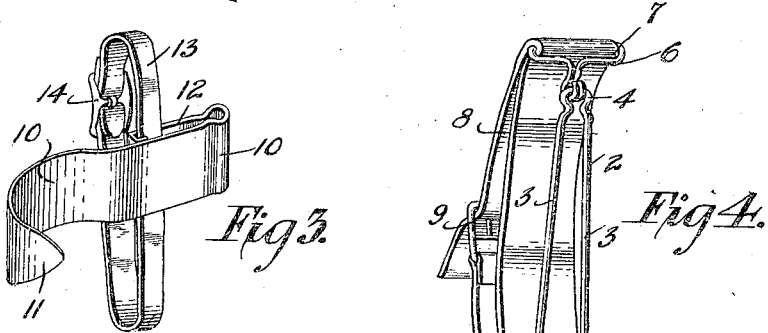
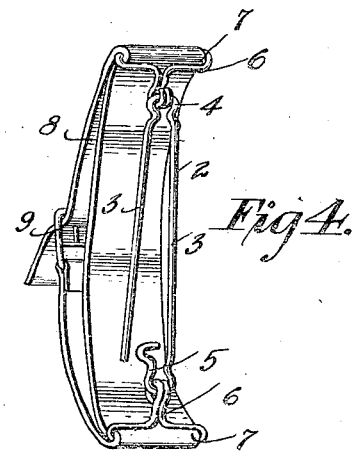
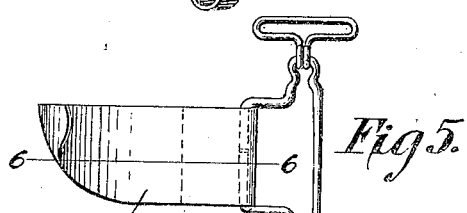
Inventor
Frederic Martin
By C. C. Shepherd
Attorney Patented Dec. 26, 1922.

1,440,164

UNITED STATES PATENT OFFICE.

FREDERIC MARTIN, OF COLUMBUS, OHIO.

CORN-HUSKING DEVICE.

Application filed March 25, 1921. Serial No. 455,587.

*To all whom it may concern:*

Be it known that FREDERIC MARTIN, a citizen of the United States, residing at Columbus, in the county of Franklin and State of Ohio, has invented certain new and useful Improvements in Corn-Husking Devices, of which the following is a specification.

This invention relates to improvements in corn husking devices, and has for its primary object the provision of a device of this nature which is capable of being readily secured to the hand of an operator so as to be securely held thereon and to embody a claw structure which is formed to include an improved pivotal mounting, whereby the claw structure may be flexed or oscillated so as to be brought into proper engagement with the corn to be husked.

In carrying out the invention, there is employed a corn husking device which includes a bail member capable of being applied to the palm of an operator's hand and to be securely held in such applied position by a flexible band or strap, and to provide in conjunction with said bail member a pivoted husk removing claw, which is formed to extend parallel with the fingers of the operator so as to be capable of being engaged thereby, in order that during the husking operation the claw may, by finger pressure, be forced into the corn body by a natural and convenient operation so as to loosen the husk therefrom, the bail member serving, therefore, to anchor the claw in its operative position and yet to permit of free swinging movement on the part thereof when an ear of corn is grasped by the operator.

With these and other objects in view, as will appear as the description proceeds, the invention accordingly consists in the novel features of construction, combinations of elements and arrangements of parts, hereinafter to be fully described and pointed out in the appended claims.

In the accompanying drawing, forming a part of this specification, and in which similar characters of reference denote like and corresponding parts throughout the several views thereof:

Figure 1 is a perspective view of the improved corn husking device comprising the present invention, Figure 2 is a horizontal sectional view taken through the device, Figure 3 is a detail view of the husking claw, Figure 4 is a similar view of the bail member, Figure 5 is a side elevation disclosing a slightly modified form of bail member, and Figure 6 is a sectional view taken along the line 6—6 of Figure 5.

Referring more particularly to the details of the invention, the numeral 1 designates my improved corn husking device in its entirety. In the preferred form of the device, which form has been illustrated in Figures 1 to 4 inclusive, use is made of a bail member 2, this bail member is ordinarily formed from a section of bent wire, which includes spaced parallel legs 3, a closed upper end 4 and a fastening 5 for connecting the separable ends of the bail member. It will be understood that the legs 3 contain a certain degree of resiliency, which tends to separate the lower ends of the legs 3, and this tendency to separate is counter-acted by reason of the fastening 5. The bail member, as shown in Figure 1, is adapted to be positioned across the palm of the operator's hand, and may be secured in this position through the agency of very numerous types of fastening straps, belts, bands or other similar devices. However, in the present instance the opposite ends of the bail member are provided with members 6 wherein are provided elongated slots 7, for the reception of the medial portions of an elastic band 8, the latter being adapted to be stretched about the back of the operator's hand, the ends of said band being adjustably connected by means of a buckle construction 9. This construction allows the band 8 to be securely adjusted upon the operator's hand, compensates for wear and slackness in the band and serves to retain the bail member in fixed position of application.

Arranged to be pivotally carried by one of the legs 3 is a claw member 10. This claw member is formed from sheet metal, or its equivalent and is provided at its outer end with a curved prong 11. The body of the prong 10 extends parallel with the fingers of the operator so as to be capable of being engaged thereby in order that said claw will be at all times under the instant and convenient control of the operator. The inner end of the claw member terminates in an overlapped end 12, which is bent around the bail member so as to receive one of the legs 3 thereof, and by this construction the said claw member will be pivotally connected with or mounted upon the bail member. Also, the overlapped end 12 is adapted to receive a flexible band or strap 13, which is capable of passing around the fingers of the operator, as shown, in order that the body of the claw member will be maintained in contact with the fingers and hence readily responsive to such finger movements that the operator may employ to oscillate or flex the claw member relative to its pivot. The strap 13 may also carry an adjustable fastening device 14.

In operation, it will be apparent that the device described may be securely yet detachably connected with the operator's hand so that the same will not slip off, lose its adjusted position or become otherwise accidentally displaced when in active operation. Thus, the band 8 will serve to securely lock the bail member 6, and to prevent longitudinal movement thereof upon the palm of the hand. In this connection, the strap 13 will also serve to hold the claw member 10 in its operative position, with the main body portion thereof extending longitudinally with the fingers. Then, when it is desired to remove the husk from an ear of corn, the latter is grasped by a normal and natural movement, which results in causing the pronged end of the claw member to force itself into husk so that the latter will be ripped or torn, thus enabling the husk to be grasped and withdrawn from about the ear. By this construction considerable speed may be employed by the operator in husking corn, since all movements involved through the use of the device are natural and easy to effect, this being in contra-distinction to many devices heretofore used wherein awkward or unnatural movements must first be employed in the loosening of the husks. It will be apparent that in the construction of the device disclosed, the separable ends of a bail member may be sprung apart to permit the claw member to be removed from its position in connection therewith. This enables the said claw member to be replaced by another of varying size, for the purpose of providing a complete device which will be best adapted to the individual requirements of the operator. Also, the leg 3 upon which the claw member is pivotally mounted is provided with a sleeve or ferrule 15, which serves to properly position the claw in connection with the bail member and to prevent undue vertical movement on the part thereof.

In the form of the invention disclosed in Figures 5 and 6, the sleeve 15 may be eliminated and in lieu thereof a bail member 16 is utilized which has one of the legs thereof formed with an inwardly bent yoke shaped portion 17. This portion is adapted to receive the inner end 18 of a claw 19, and it will be apparent that the yoke shaped portion 17 will serve to constitute an efficient pivot for the claw which will serve to permit of the free flexing thereof and to eliminate loss of vertical adjustment. It will be apparent that the bail member 16 may be attached to the hand either by means of the fastening bands described or any other equivalent structure. Since it is not convenient to remove the claw 19 employed in connection with the modified form of the invention, I form the claw so that the same may be horizontally adjusted with respect to the bail member. This is accomplished by providing the inner end of the claw with an overlapped portion 20, which surrounds the yoke 17 in such manner as to constitute a vertical pivot for the claw. However, the overlapped portion 20 is formed to include a plurality of vertically extending sockets 21, any one of which being capable of pivotally receiving the yoke 17. Thus, by reason of the resiliency of the portion 20, it will be apparent that the vertical part of the yoke 17 may be selectively positioned within either of the sockets 21, simply by slightly spreading the resilient portion 20, to permit the yoke to be forced from one socket to another. This construction serves to adjust the effective length of the claw and to enable the latter to be adapted to hands of various sizes. Also, by reason of this construction it is not necessary to sell the device with a plurality of claws, as is the case in the preferred form of the invention.

In view of the foregoing description, taken in conjunction with the accompanying drawing, it will be apparent that the present invention provides a husking device which while simple in construction is capable of being efficiently employed for the purpose of quickly, easily and expeditiously removing husk or other similar coverings from vegetable matter. The device is capable of readily conforming to the configuration of the hand, and will in no way interfere with the flexibility and freedom of movement of the various members of the hand, a feature which enables an operator to proceed normally with his work, without being cramped or hindered in any manner by reason of the use of the device. The cardinal principle to be found in the present construction resides in the manner of pivotally connecting the claw with the bail member, or any other equivalent base. This articulated construction serves to permit of the free flexing or oscillating of the device as an ear of corn is grasped, and also serves to prevent loss of adjustment on the part of the claw member.

What is claimed is:

1. A husking device comprising a bail member including a pair of spaced leg members, a hook formed upon one end of one of said legs and arranged to separably receive the resiliently movable free end of the opposite leg, eyes connected with the ends of said bail member, flexible means passing through said eyes for connecting the bail member with the palm of the operator's hand, and a claw pivotally and detachably carried by the resilient leg of said bail member.

2. A husking device comprising a wire bail member formed to include a pair of spaced legs, one of said legs being resiliently movable with respect to the other leg and capable of being connected or disconnected therewith, means for attaching said bail member to the palm of an operator's hand, and a claw device pivotally and detachably mounted upon the resilient leg of said bail member.

3. A husking device comprising a bail member, means for retaining the said bail member on the palm of the user's hand, a claw pivotally connected with said bail member, means whereby the pivotal positions of said claw with respect to said bail member may be longitudinally adjusted, and a device for retaining said claw in engagement with the fingers of the hand.

In testimony whereof I affix my signature.

FREDERIC MARTIN.